June 26, 1962  W. A. RAY  3,040,775
SOLENOID OPERATED FOUR-WAY VALVE
Filed Jan. 4, 1960

INVENTOR.
WILLIAM A. RAY
BY
Flam and Flam
ATTORNEYS.

United States Patent Office 3,040,775
Patented June 26, 1962

3,040,775
SOLENOID OPERATED FOUR-WAY VALVE
William A. Ray, North Hollywood, Calif., assignor to General Controls Co., a corporation of California
Filed Jan. 4, 1960, Ser. No. 219
3 Claims. (Cl. 137—623)

This invention relates to a valve structure.

In many applications, valves are used to cause flow of fluid or liquid under pressure optionally on either side of a piston operating in a clinder. One of the cylinder spaces defined by one side of the piston may, for example, be supplied with fluid or liquid, and the other cylinder space must then be connected to exhaust. The piston is thus urged to move in one direction. To reverse this movement, the valves controlling the flow of fluid or liquid are altered so that now the space from which fluid or liquid was exhausted is supplied with fluid or liquid under pressure, and the other space is connected to exhaust.

It is one of the objects of this invention to provide a simple and effective valve structure, having only a few moving parts, that can accomplish these functions.

It is another object of this invention to provide a compact valve of this character that is capable of operation by a single solenoid.

It is still another object of this invention to provide adequate packing internally of the valve structure against leakage of the fluid or liquid out of the valve structure.

This invention possesses many other advantages and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings.

Figure 1:
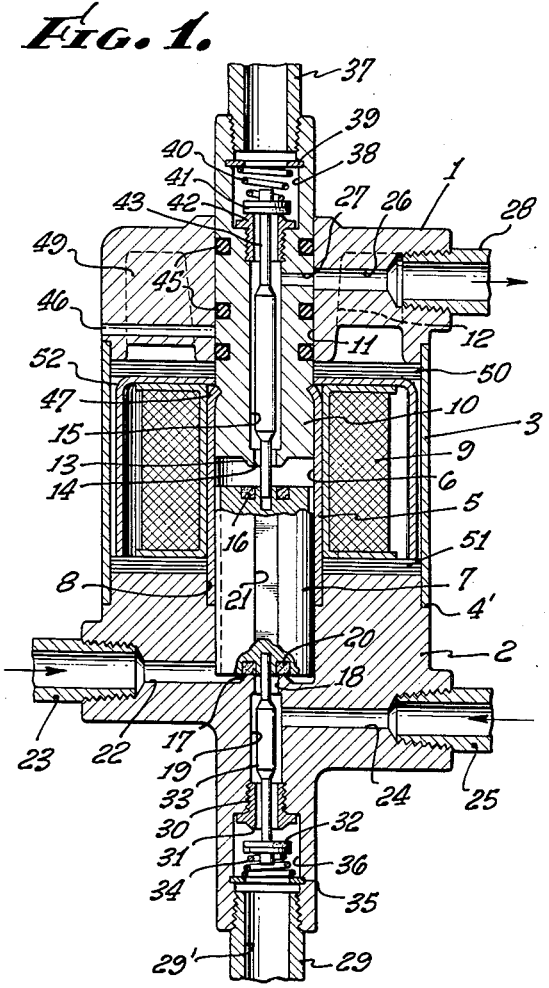
FIGURE 1 is a longitudinal section of a valve structure incorporating the invention.
Figure 3:
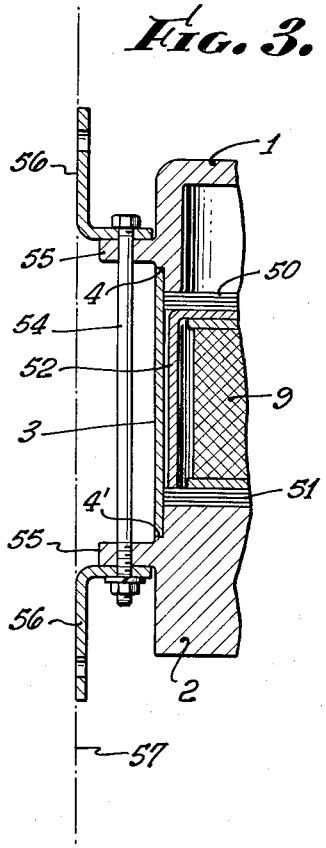
FIG. 3 is a sectional view, taken along a plane corresponding to line 3—3 of FIG. 2.
Figure 2:
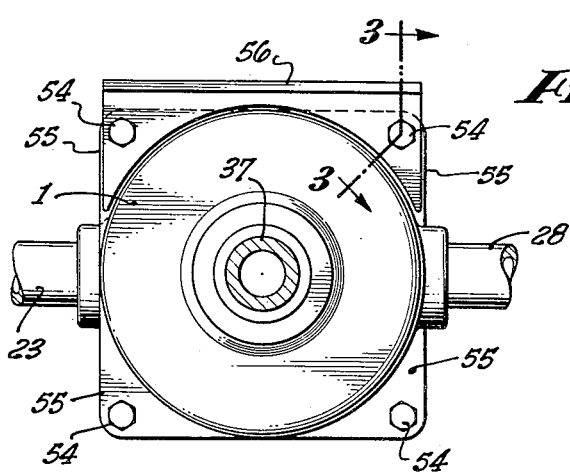
FIG. 2 is a plan view thereof.

The body of the valve is formed by the aid of an upper end member 1 and a lower end member 2. These may conveniently be made of castings, preferably of non-magnetic material.

Joining the two end members 1 and 2 is a cylindrical casing member 3 having ends accommodated on the shoulders 4 and 4' respectively formed on the end members 1 and 2. The end members both have opposed rectangular flanges 55 through the corners of which fastening bolts 54 can pass to clamp parts 1, 2 and 3 together. Brackets 56 may also be clamped by two of the bolts to facilitate supporting the valve on a wall surface 57.

Extending from the upper surface of the end member 2 is a sleeve-like member 5 which defines a guide opening or aperture 6 for a magnetic plunger 7. The lower end of the sleeve 5 is press-fitted into a corresponding aperture 8 formed in the upper surface of end member 2.

The plunger 7 is adapted to be influenced by the energization of electromagnet coil or solenoid coil 9 surrounding the sleeve 5.

Limits are formed for the movement of the plunger 7 in either direction. An upper limit is formed by the lower surface of a plug member 10 which is press-fitted into an aperture 11 formed in an inwardly directed boss 12 integrally joined to the end member 1. The lower or inner end of the plug 10 is provided with a raised valve seat 13. This valve seat surrounds a passage or port 14, having an enlarged portion 15. The upper end of the plunger 7 carries an insert 16 of yielding material to operate as a closure in cooperation with the seat 13.

A similar arrangement is provided at the lower end of the end member 2. A raised valve seat 17 is provided for a port 18 which enlarges to a passageway 19. Cooperating with the seat 17 is the yielding closure member 20 carried in the lower end of the plunger 7.

The plunger 7 also has one or more external grooves 21 that permit inlet fluids to pass into the aperture or guide opening 6 by way of a transverse inlet opening 22. This inlet opening communicates with a fitting 23, leading to a source of fluid supply under pressure. The opening is in communication with the interior of the aperture 6.

When the coil 9 is deenergized, as shown in FIG. 1, the plunger 7 rests upon the valve seat 17 and shuts off the flow of fluid to the passage 19, and to a port 24 transverse to the passage 19 and communicating with a fitting 25.

In the unenergized position shown, a port 26 in member 1 is placed in communication with the inlet port 22. Thus, the path of the fluid extends from the inlet port 22 through the grooves 21, into the sleeve 5, port 14, the passageway 15, through the intercepting passage 27 formed in the plug 10, and port 26 to a fitting 28.

The fitting 25, while the plunger 7 is in the unenergized position, is then connected to an exhaust opening 29' formed by a fitting 29. Between the valve seat 17 and the fitting 29 there is located a valve seat member 30 which provides a valve seat 31 for a closure 32. Member 30 has a flanged body which is threaded into the lower end of port 19. A counterbore 36 for the port 19 provides a shoulder for the flange of the member 30.

Closure 32 is mounted on a valve stem 33 attached to the plunger 7, as by having its upper end slidably fitted into the plunger 7. Furthermore, the stem 33 may be enlarged at its central portion for the sake of lending rigidity to the stem.

The valve closure 32 is urged downwardly by the weight of the plunger 7 against the force of a light conical compression spring 34 mounted on a split ring 35. This ring is accommodated within a groove formed in the interior of counterbore 36.

The plug 10 is provided at its upper end with an exhaust fitting 37. Furthermore, this upper end is also provided with an opening or passage 38 having a groove in which a split ring 39 is engaged. A light conical compression spring 40 rests on the lower surface of the ring 39 and urges a closure 41 against a valve seat formed by the valve seat member 42. This valve seat member is threaded into the upper end of the passage 15. It has a flange seated on a shoulder formed between opening 38 and passage 15. The valve closure member 41 is carried at the upper end of a valve stem 43. The lower end of this valve stem 43 is slidably fitted into the upper end of the plunger 7.

The plunger 7 is sealed so as to prevent ingress or egress of material into or out of the guiding aperture 6, as by the aid of a series of spaced O-rings 45. Between the lower two O-rings is located a vent 46 so as to permit removal of any fluent material that may be exuded past the innermost O-ring 45.

In order to form a continuous passage for the vent 46 to the exterior of the end member 1, a web or boss 49 is provided between the central boss and the exterior wall of the end member 1.

The sleeve 5 has an inwardly turned upper end 47 which engages in an appropriately formed groove in the exterior surface near the lower end of the plug 10. This edge thus joins the sleeve 5 and plug 10 together.

In the unenergized position shown in FIG. 1, fluid from the inlet port 22 can proceed, as hereinbefore stated, to the fitting 28, thence to any appliance (such as a piston-cylinder mechanism) which requires fluid pressure for its operation. Return for the fluid in this position is provided by the fitting 25 which exhausts to the fitting 29 via passages 24 and 19, past valve seat 31, and then to the exhaust fitting 29.

When the plunger 7 is in its energized position, the conditions are reversed. Under such circumstances, the spring 34 urges closure 32 against seat 31; the seating of the closure 16 on the seat 13 shuts off the flow of fluid under pressure to the fitting 28. However, in this position, the fitting 28 provides an exhaust path by way of the ports 26 and 27, past the valve seat 42 which is lifted by the plunger, and then through passageway 38 to the exhaust fitting 37. At the same time, fluid under pressure flows to fitting 25, via open port 18, and passages 19 and 24.

The magnetic circuit for the coil 9 is completed by the aid of stacks of laminations 50 and 51, disposed above and below the coil 9. A magnetic shell 52 has an upper wall through which the plug 10 extends. This shell is clamped between the stack 50 and the coil 9. The shell is also provided with a flange, the lower end of which contacts the laminations 51.

One of the advantages of the structure is the ease with which the elements may be readily assembled and disassembled. The plurailty of fastening devices or bolts 54 firmly clamp end members 1 and 2 to the casing 3; and at the same time, the elements of the magnetic circuit are also urged together between the inner surfaces of the end members 1 and 2.

The inventor claims:

1. In a valve: a valve body structure having an inlet port, as well as a pair of additional spaced ports, each optionally being capable of permitting flow of fluid in either direction through the additional port; said body structure having a guiding aperture located between the pair of ports; a plunger in the aperture made of magnetic material; a solenoid coil surrounding the guiding aperture; means forming abutments limiting movement of the plunger in each direction; said inlet port leading into the aperture, and adjacent one end of the aperture, and connected via a passage through the plunger with the other end of the aperture; said body structure having a pair of exhaust ports coaxial with the plunger, each exhaust port having a seat; said exhaust ports being respectively associated with the pair of additional ports; valve stems respectively carried by the opposite ends of the plunger and extending longitudinally of the plunger; valve closures respectively carried by the stems for cooperating with the seats in the exhaust ports; plunger movement in one direction closing the exhaust port associated with said one of the additional ports, and opening the other; a pair of additional valve closure means respectively at opposite ends of the plunger for closing the flow of fluid from the inlet port to either of the additional ports for permitting flow only to that additional port that is associated with the closed exhaust port.

2. In a valve structure having a valve body provided with an inlet port that communicates with the interior of a guide opening, as well as a plunger in the guide opening that is adapted to be moved from one limited position to another whenever a coil surrounding the guide is energized, the combination therewith of means forming a pair of passages extending longitudinally respectively from each end of the guide opening; a pair of valve stems carried at opposite ends of the plunger and extending into the passages; valve seats in said passages; valve closures carried by the stems cooperating with said seats in such manner that one valve closure is in open position while the other closure is in closing position; said guide opening at its opposite ends being provided with inwardly directed valve seats cooperating with the ends of the plunger for optionally interrupting flow of fluid from the inlet port into the passages; and means forming additional passages respectively transverse to said first passages, and each additional passage opening into the corresponding longitudinal passage and between those valve seats that are associated with the respective longitudinal passage.

3. In a valve: a valve body structure having an inlet port, as well as a pair of additional spaced ports, each optionally being capable of permitting flow of fluid in either direction through the additional port; said body structure having a guiding aperture located between the pair of ports; a plunger in the aperture made of magnetic material; a solenoid coil surrounding the guiding aperture; means forming abutments limiting movement of the plunger in each direction; said inlet port leading into the aperture; said plunger having a passage for causing both ends of the aperture to be in communication with the inlet port; said body structure having a pair of exhaust ports coaxial with the plunger, each exhaust port having a seat; said exhaust ports being respectively associated with the pair of additional ports; and means operated by movement of the plunger in one direction in its guiding aperture for simultaneously connecting one of the pair of additional ports to the inlet port, closing the associated exhaust port, disconnecting the other of the pair of additional ports from the inlet port, and connecting the other exhaust port to the other of said pair of additional ports, so that flow of fluid through one of the pair of additional ports is from the inlet port through said one of the pair of additional ports, and so that flow of fluid through the other of the pair of additional ports is into its associated exhaust port; movement of the plunger in the other direction serving to reverse the flow of fluid through each of said pair of additional ports; said means operated by movement of the plunger including a pair of valve closures carried at each end of the plunger, one for controlling the corresponding exhaust port, and the other for controlling the flow of fluid from the inlet port, the pair of closures being so arranged that one closure is in closing position while the other closure of the pair is in opening position.

References Cited in the file of this patent

UNITED STATES PATENTS

| | | |
|---|---|---|
| 1,306,966 | Marcoux et al. | June 17, 1919 |
| 2,799,293 | Clay | July 16, 1957 |
| 2,830,743 | Rimshan et al. | Apr. 15, 1958 |
| 2,861,592 | Collins | Nov. 25, 1958 |
| 2,891,577 | Stewart | June 23, 1959 |
| 2,966,168 | Hunt et al. | Dec. 27, 1960 |